United States Patent

[11] 3,622,436

[72] Inventor John N. Johnson
 Utica, Mich.
[21] Appl. No. 38,206
[22] Filed May 18, 1970
[45] Patented Nov. 23, 1971
[73] Assignee General Motors Corporation
 Detroit, Mich.

[54] HIGH TEMPERATURE SEAL
 5 Claims, 7 Drawing Figs.

[52] U.S. Cl. ..................................................... 161/160,
 161/170, 161/196
[51] Int. Cl. ..................................................... B32b 3/26
[50] Field of Search............................................ 161/160,
 161, 168, 169, 170, 196

[56] References Cited
UNITED STATES PATENTS
3,556,914 1/1971 Juras ............................ 161/5

Primary Examiner—William J. Van Balen
Attorneys—Sidney Carter and Peter P. Kozak ABSTRACT: A rubbing contact fluid seal, particularly suitable for use in a gas turbine engine rotary regenerator, comprising a reticulate metal facing layer bonded to a base member and adapted for rubbing contact with the regenerator, the facing layer having disposed in the pores thereof a seal material consisting of, by weight, 53 to 67% $NiFe_2O_4$, 3 to 18% ZnO and 28 to 32% sodium silicate which material is bonded in and to the facing layer by curing at 500° F.

INVENTOR
John R. Johnson
BY
Peter P. Kozak
ATTORNEY

INVENTOR.
John N. Johnson
BY
Peter P. Kozak
ATTORNEY

HIGH TEMPERATURE SEAL

This invention relates to a rubbing contact fluid seal suitable for use in a rotary regenerator for gas turbine engine applications and, more particularly, to a fluid seal material for such applications having a relatively low coefficient of friction, low wear rate and good chemical stability at elevated temperatures in an oxidizing environment.

Currently, there is a family of gas turbine engines which use rotating disc-type regenerators to recover usable heat from exhaust gases to preheat incoming combustion air. A necessary requirement of the regenerator system is an effective seal across the faces of the rotating disc to prevent leakage of the high pressure incoming air into the counterflowing exhaust gas. A rubbing seal is desired as it has the potential for lowest leakage. These rubbing seals are required to operate at a maximum temperature of about 600° F. on the outboard or cold side of the seal and at temperatures up to 1200° F. on the inboard or hot side of the seal. The desired properties of the rubbing seal material are that it have good oxidation resistance and thermal stability, good wear resistance, a relatively low coefficient of friction over a wide range of temperatures, and that it exhibit overall compatibility with the regenerator matrix material. In addition, since metallic regenerators assume a slight spheroidal inward bulge during operation, the seal must be flexible enough to conform to the shape of the regenerator.

Accordingly, it is an object of my invention to provide a rubbing contact fluid seal for use in the regenerator portion of a gas turbine engine which has relatively low friction and wear properties and which is resistant to the deleterious effects of high temperatures typical of those found in gas turbine engines.

It is another object of my invention to provide a relatively low-friction, low-wear seal material which is resistant to oxidation and deterioration at elevated temperatures and which has a relatively constant coefficient of friction over a wide range of temperatures.

In the preferred embodiment of my invention these and other objects are accomplished by providing a seal having a metallic base and a reticulate nickel facing layer adapted for rubbing contact with a rotating regenerator matrix and characterized by fibrils forming a substantially uniform, three-dimensional skeletal network with interconnected pores therebetween bonded to the base with the seal being held against the regenerator matrix such that the facing layer is continuously in rubbing contact with the opposed radial faces of the matrix. In accordance with the principal feature of my invention the pores of the facing layer are filled with a seal material consisting essentially of, by weight, about 53 to 67 percent $NiFe_2O_4$, 3 to 18 percent ZnO water insolubilizing agent and 28 to 32 percent sodium silicate binder which material is bonded to the fibrils of the facing layer by a low temperature oven cure wherein the sodium silicate binder reacts with the ZnO to create a water insoluble bond between the $NiFe_2O_4$ and the facing fibrils.

Other objects and advantages of my invention will become more apparent from the following detailed description of the invention reference being had to the accompanying drawings, of which:

Figure 1:
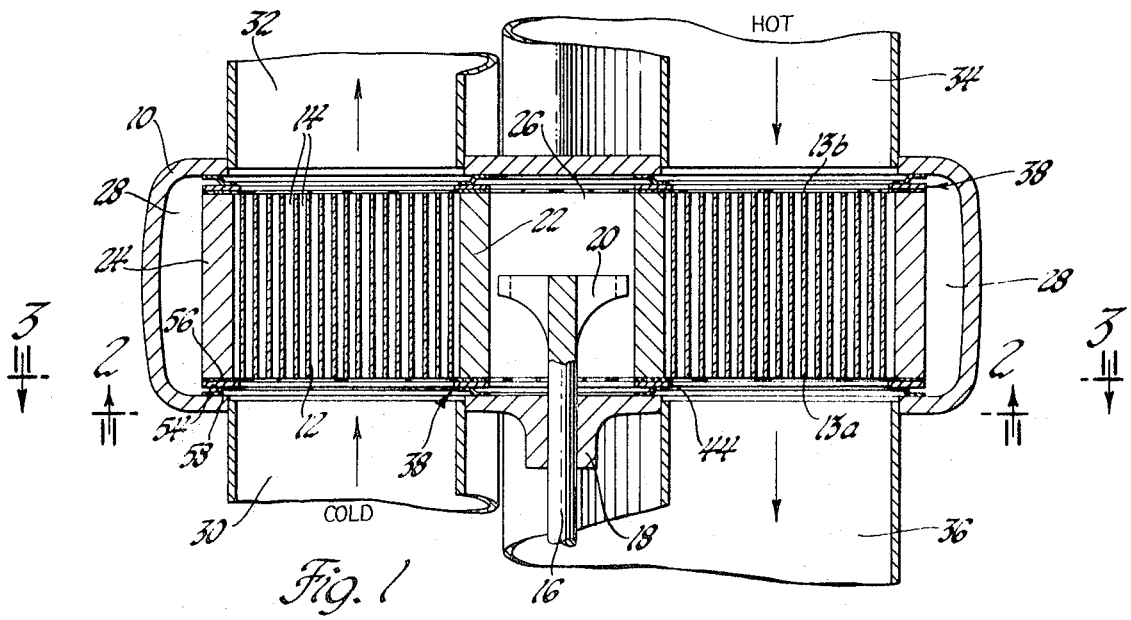
FIG. 1 is a schematic sectional view of a rotary regenerator taken on the plane indicated by line 1—1 in FIG. 2.
Figure 2:
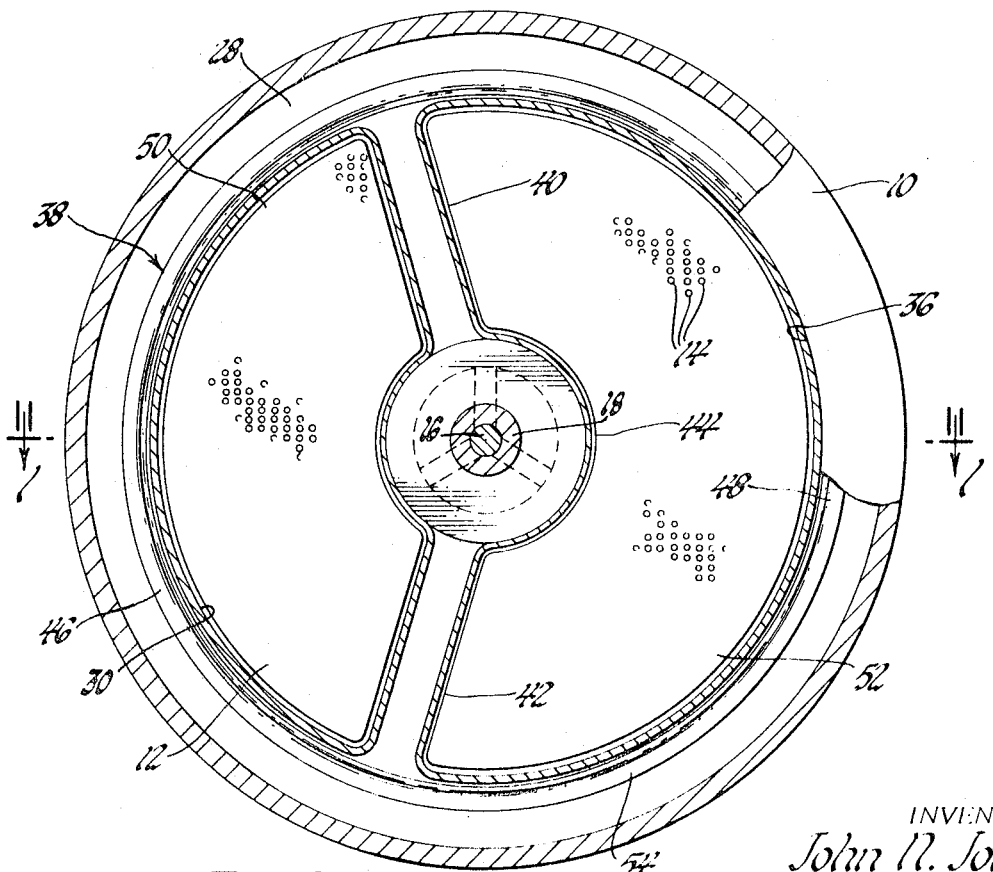
FIG. 2 is a sectional view of the same taken in a plane indicated by the line 2—2 in FIG. 1.
Figure 3:
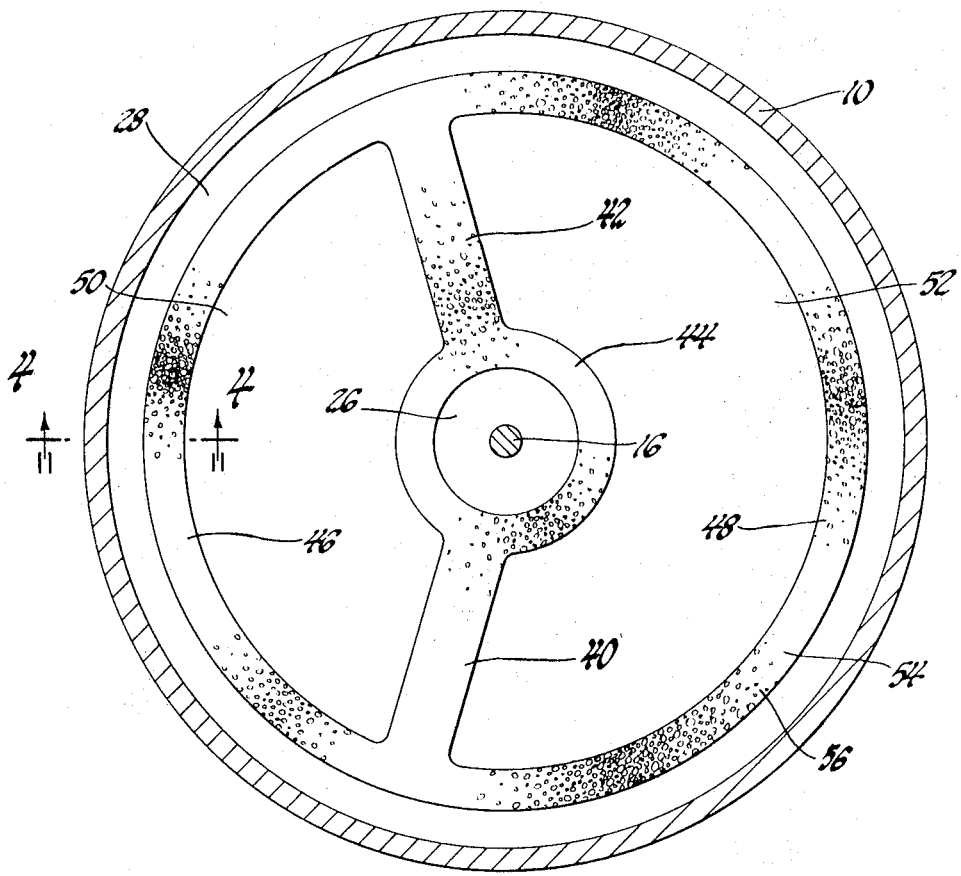
FIG. 3 is a sectional view of the same taken in a plane indicated by the line 3—3 in FIG. 1.

FIGS. 1 to 3 generally show schematically a disc-type rotary regenerator portion of a gas turbine engine (not shown).

Referring first to FIG. 1, the regenerator comprises a housing 10 which is generally drum-shaped and which encloses an annular matrix 12 which is of a structure defining pores or passages 14 (greatly enlarged in FIG. 1) extending between the opposed radial faces 13a and 13b of the matrix generally parallel to the axis of rotation defined by a driving shaft 16. The matrix 12 is fabricated from alternate spiral layers of flat and corrugated stainless steel sheet stock or a ceramic. Shaft 16 is mounted in suitable bearings in a boss 18 on the housing and terminates in a spider 20 which is coupled by means (not shown) to the matrix so that the matrix may be rotated slowly. The matrix preferably includes a nonporous inner rim 22 and a nonporous outer rim 24. A generally cylindrical space 26 is defined within the interior of the matrix and a space 28 extends around the periphery of the matrix within the housing 10. An inlet 30 for cold, high pressure air enters one face of the housing and opposite to it an outlet 32 is provided for the heated compressed air. The hot, low pressure exhaust gases enter through an inlet 34 and leave the regenerator through an outlet 36, the two streams thus being in counterflow relation.

A seal 38 is provided between each radial face of the matrix and the housing in rubbing contact with the rotating matrix to confine the cold and hot gases to the desired paths through the matrix from inlet to outlet and thereby minimize leakage between the paths. As shown more clearly in FIGS. 2 and 3, such a seal comprises two arms 40 and 42 extending radially of the matrix base preferably joined at the inner rim of the matrix by a circular seal portion 44 extending around the interior cavity 26 and joined at the outer rim of the matrix by an arcuate rim or bypass seal 46 extending around the high pressure path and an arcuate rim seal 48 extending around the low pressure path. The seal assembly thus defines an opening 50 for the cold, high pressure air and an opening 52 for the hot, low pressure exhaust gas. These openings, as shown in FIG. 2, conform generally in the outline of the ducts 30 and 32, and 34 and 36, respectively.

Figure 4:
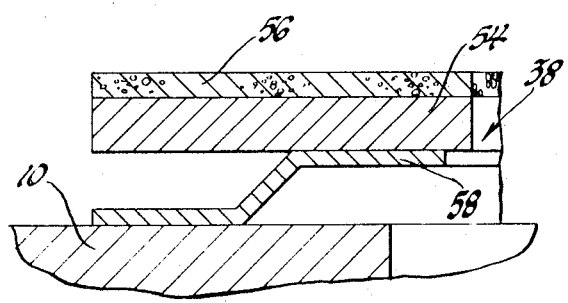
FIG. 4 is an enlarged view of a portion of the seal shown in FIG. 1.

The seal 38 in rubbing contact with the matrix 12 comprising portions defining the arms 40 and 42, the inner seal portion 44 and the outer seal portion comprised of arcs 46 and 48, as indicated in FIGS. 2 and 3, is comprised of a stationary base member 54 which is a flat sheet of metal, for example, a stainless steel sufficiently thick to be reasonably stiff and rigid, but sufficiently flexible to curve slightly in accordance with any distortion of the matrix, and a facing layer 56 which covers the forward or matrix face of the base 54, as shown in FIG. 3. During engine operation, the seal is held against the regenerator by a gas pressure differential between the high pressure incoming air and the low-pressure exhaust such that the facing layer 56 is continuously in rubbing contact with the rotating matrix 12. The pressure differential also acts to hold flexible metal leaf seals 58 (FIG. 4) which are welded to the base 54 against the adjacent housing 10.

Figure 4A:
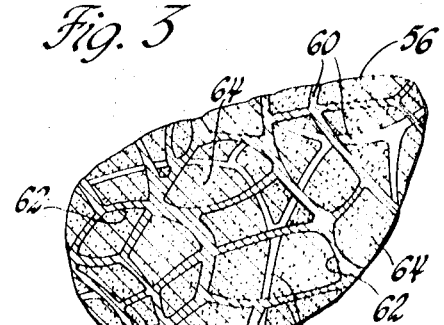
FIG. 4a is an enlarged view of a portion of FIG. 4.

Referring now to FIG. 4a, the facing layer 56 is a porous structure characterized by fibrils 60 which form a three-dimensional skeletal network with pores 62 therebetween. In accordance with the principal feature of my invention the pores 62 of the facing 56 are filled with a seal material 64 which consists of a major portion of $NiFe_2O_4$ (nickel ferrite) which has a spinel-type crystal structure and a minor portion of ZnO with a sodium silicate binder. This material performs with a moderate friction coefficient, low wear rate and exhibits good chemical stability at high temperatures in an oxidizing environment which are necessary requirements for a seal material for use in a gas turbine engine rotary regenerator. The seal material 64 fills the pores 62 of the facing layer 56 and is bonded to the fibrils 60 such that the facing retains and reinforces the nickel ferrite seal material allowing the seal to flex as the regenerator distorts in operation, while the nickel ferrite provides the requisite low friction and wear sealing properties.

The porous facing may be any of the well-known cellular, reticular or sintered type structures having a porosity and pore configuration such that the nickel ferrite seal material forms a major part of the rubbing contact surface while the facing acts only as a support structure forming a minor part of the rubbing contact surface. In this manner the friction characteristics of the seal will be mainly those of the nickel ferrite with the friction characteristics of the facing having only a minimal effect. It is also desirable that the facing be of a material having thermal expansion properties similar to the nickel ferrite, the base 54 and the matrix 12 to minimize distortion or warpage due to differing coefficients of thermal expansion between materials. Nickel or nickel alloys containing predominately nickel have been found to be suitable materials for the facing. I have found that a reticulate-type structure (shown schematically in FIG. 4a) which is a three-dimensional skeletal structure of interconnected fibrils with no membranes or windows partitioning the contiguous pores, such as that described in an article appearing in the Apr. 1968 issue of Materials Engineering at page 44, to be preferred facing structure because the reticulate structure allows the seal material to flow between the interconnected pores and form a continuous seal phase. The structure described in the article is a metal foam produced by electroplating a layer of nickel on a reticulated urethane substrate to produce a continuous metal network of interconnected pores with a pore density of 10 to 100 pores per inch. The Ball U.S. Pat. No. 3,111,396 discloses an alternative method of forming the metal foam by depositing a slurry of a liquid and finally divided metal powder on an open-pore type organic structure such as polyurethane and then sintering the coated structure to produce a continuous skeletal metal structure. I have found that a reticulate nickel foam having a density of about 45 pores/inch serves as an excellent facing material.

The rubbing seal 38 for use in a rotary regenerator is formed by first disposing the porous facing layer about one-eighth inch thick on the base 54 (FIGS. 3 and 4) and bonding the facing thereto such that the facing conforms to and covers arms 40 and 42 and rims 44, 46, and 48. In my preferred seal construction, the base 54 is formed of type 430 stainless steel and is about 0.060 inch thick. The members are bonded together by conventional powder furnace brazing. A suitable braze material is Nicrobraz 30 a product of Wall Colmonoy Corporation, which has a typical composition of 71 percent nickel, 19 percent chromium and 10 percent silicon.

The facing is filled by first preparing a slurry composition consisting of from about 53 to 67 wt. percent of powdered $NiFe_2O_4$ and from about 28 to 32 wt. percent sodium silicate solution with a minor addition of zinc oxide. A suitable type of sodium silicate is sodium silicate "D," a product of the Philadelphia Quartz Company which has the following characteristics as listed by the manufacturer:

| | |
|---|---|
| Weight ratio $SiO_2/Na_2O$ | 2.00 |
| Weight % $SiO_2$ | 29.40 |
| Weight % $Na_2O$ | 14.70 |
| Density, °Be | 50.5 |
| Density, lbs./gal. | 12.8 |
| Viscosity, centipoises | 350 |

The ZnO is a water insolubilizing additive which reacts with the sodium silicate during an oven curing treatment, hereinafter described, to form a water insoluble bond between the $NiFe_2O_4$ and the fibrils of the facing. Additions of about 3 wt. percent ZnO are sufficient for the water insolubilizing reaction, however, I have found that increased amounts of ZnO over that required for the water insolubilizing reaction up to about 18 wt. percent are effective in reducing the coefficient of friction of the seal in the 800° to 1100° F. range. The slurry composition is placed in a vertically positioned tube having an opening surrounded by an annular disc placed tightly against the facing. Pulses of air are applied to the slurry by means of a solenoid valve arrangement whereby the slurry flows out the opening and into the support. The base seals the bottom side of the facing while the annular disc seals the top thereby causing the slurry to flow concentrically outward filling the pores of the facing.

After filling, the seal is subjected to an oven curing treatment to remove the water from the slurry and to bond the $NiFe_2O_4$ to the facing fibrils, as previously mentioned. The curing treatment used is as follows:

Heat to 150° F., hold for 2 hours
Heat to 175° F., hold for 1 hour
Heat to 200° F., hold for 1 hour
Heat to 225° F., hold for 1 hour
Heat to 250° F., hold for 1 hour
Heat to 500° F., hold for 1 hour
All heating rates above 150°
are at 50° F. per hour The curing treatment is performed in a steplike manner in order to avoid bubbling of the sodium silicate. The water insolubilizing reaction between the ZnO and the sodium silicate takes place at about 500° F.

For the purpose of demonstrating the utility of my invention, 1-inch diameter test buttons were made and held in a stationary fixture against a rotating regeneratorlike disc having a construction similar to that of a full size regenerator. The test apparatus allowed for varying the sliding speed, temperature and bulk load on the button.

Figure 5:
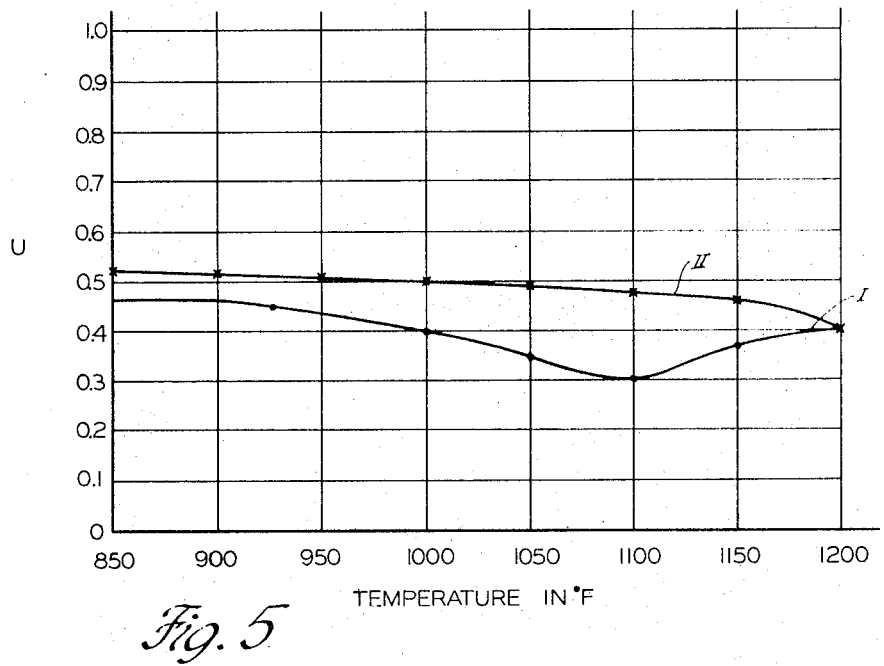
FIG. 5 is a graph showing the change in the coefficient of friction of the seal material with temperature.

Referring to FIG. 5, there is shown a graph of the variation in coefficient of friction, $\mu$, with temperatures over a range of 850° to 1200° F., which is typical of those normally found in gas turbine engine operation, for two test samples. Line I shows the test results for a seal facing material before curing consisting of, by weight, 66.9 percent $NiFe_2O_4$ 3.5 percent ZnO and 29.6 percent sodium silicate disposed in and bonded to a nickel reticular facing structure. The test was conducted at a sliding speed of 56.6 feet/min. at a load of 5 p.s.i. against a type 430 stainless steel regenerator disc. FIG. 5 indicates that the seal had a moderate coefficient of friction over the temperature range with $\mu \leq 0.4$ between 1000° and 1200° F. Examination of the seal and disc after 8.3 hours of testing showed a seal wear of 0.4 mils, disc wear of 0.3 mils and no damage to either the seal or regenerator disc. Line II of FIG. 5 shows the test results under the same conditions for a seal material before curing consisting of, by weight, 63.4 percent $NiFe_2O_4$, 7 percent ZnO and 29.6 percent sodium silicate. It may be seen that the coefficient of friction had a somewhat more stable variation with temperature than the previous material with $\mu \leq 0.5$ over the temperature range which dropped to 0.4° at 1200° F.

Figure 6:
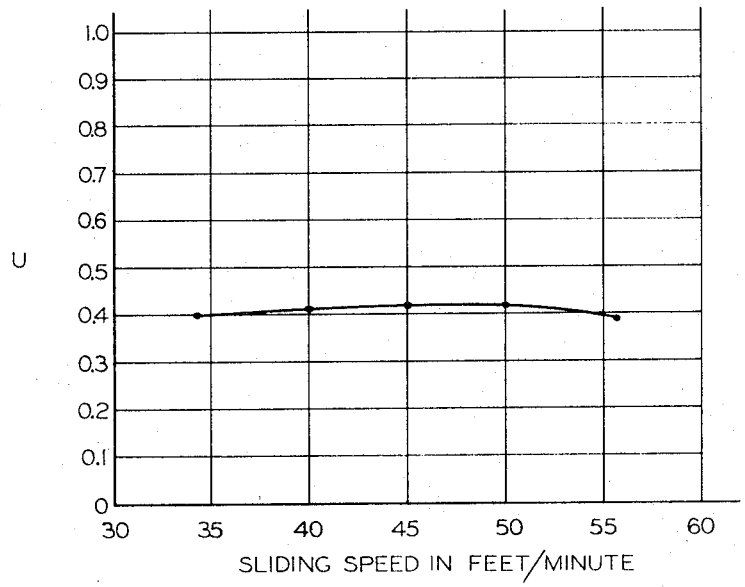
FIG. 6 is a graph showing the change in the coefficient of friction of the seal material with sliding speed.

FIG. 6 shows the variation in coefficient of friction with sliding speed for the 66.9% $NiFe_2O_4$–3.5% ZnO–29.6% sodium silicate material previously described in FIG. 5 at 1200° F. under the test conditions previously described. It may be seen that the coefficient of friction remained relatively stable over a range of sliding speeds which is important to efficient operation of a rotary regenerator.

For the purpose of demonstrating the life of my seal material, long range testing was performed in which three test buttons were made of the 66.9% $NiFe_2N_4$–3.5% ZnO–29.6% sodium silicate material previously described and run at 1200° F. under a load of 5 p.s.i. at a sliding speed of 84 feet/min. for 650 hours. Examination of the seal and disc after testing showed an average seal wear of 1.6 mils, an average disc wear of 0.5 mils and a seal contact area of 100 percent. No damage was noted to the disc. Control samples which were placed in an oxidizing environment at 1200° F. for the 650 hours showed an average amount of oxidation of 0.7 mils.

Further tests were run with seal materials of varying compositions to illustrate the wear properties of those compositions. The following test parameters were used for each composition:

| | |
|---|---|
| Disc material | type 430 stainless steel |
| Disc braze material | copper |
| Seal temperature | 800°–1200° F. |
| Load | 5 p.s.i. |
| Air pressure 1.5 p.s.i.g. | |
| Disc sliding speed | 56.6 feet/minute |

The results of the tests are given in the table below:

| Overall composition percent | | | Time (hours) | Seal wear (mils) | Disc wear (mils) | Oxidation control (mils) | Percent contact |
| --- | --- | --- | --- | --- | --- | --- | --- |
| NiFe$_2$O$_4$ | ZnO | Sodium silicate | | | | | |
| 66.9 | 3.5 | 29.6 | 2.75 | 1.7 | nil | 0.7 | 100 |
| 63.4 | 7.0 | 29.6 | 2.5 | nil | 1.0 | 0.1 | 90 |
| 59.8 | 10.6 | 29.6 | 4.0 | 0.6 | 0.5 | 0.9 | 100 |
| 56.3 | 14.1 | 29.6 | 4.4 | 0.6 | 3.6 | 0.5 | 85 |
| 52.8 | 17.6 | 29.6 | 4.2 | 0.4 | 0.4 | 0.2 | 100 |

All of these compositions performed with moderate coefficients of friction in the range of 0.3 to 0.5 over the temperature range of 800° to 1200° F.

From the foregoing, it will be noted that may seal material is a relatively low-friction, low-wear material which is resistant to oxidation and deterioration at elevated temperatures and which has a relatively constant coefficient of friction over a wide range of elevated temperatures and sliding speeds. Although my invention has been described in terms of preferred embodiments with reference to a particular rotary regenerator structure, it will be appreciated that other forms may be adopted within the scope of my invention. For example, in many regenerator operations the outboard or cold side of the seal and the rim of the hot side seal operate at less than 800° F. In this case my seal material may be replaced in these regions with graphite, which has a coefficient of friction of about 0.05 but which oxidizes about 800° F., with my seal material being used only on seal regions which operate at temperatures up to 1200° F.

Thus having described my invention what is claimed is:

1. A rubbing contact fluid seal comprising a base member and a porous metal layer adapted for rubbing contact bonded to at least a portion of said base member with a seal material filling the pores of said layer and bonded therein, said seal material being formed and bonded to said layer by heating a composition consisting essentially of, by weight, about 53% to 67% NiFe$_2$O$_4$, 3 to 18% ZnO and 28 to 32% sodium silicate to a temperature of at least about 500° F. in said pores.

2. A fluid seal as defined in claim 1 wherein said layer is a reticulate nickel foam having a pore density of about 10 to 100 pores/inch.

3. A fluid seal as defined in claim 1 wherein said composition consists essentially of, by weight, about 67% NiFe$_2$O$_4$, 3.5% ZnO and 29.5% sodium silicate.

4. A fluid seal for use in the rotary regenerator portion of a gas turbine engine comprising, in combination, a stationary metal base and a reticulate nickel layer characterized by fibrils forming a three-dimensional skeletal network with interconnected pores therebetween bonded to at least a portion of said base, said layer being adapted for rubbing contact with a rotating regenerator matrix, said layer having a pore density of about 10 to 100 pores/inch, the pores of said layer being filled with a seal material bonded therein, said seal material being formed and bonded in said layer by heating a composition consisting essentially of, by weight, about 53 to 67% NiFe$_2$O$_4$, 3 to 18% ZnO and 28 to 32% sodium silicate to a temperature of at least about 500° F. in said pores.

5. A fluid seal as defined in claim 4 wherein said layer has a pore density of about 45 pores/inch and wherein said composition consists essentially of, by weight, about 67% NiFe$_2$O$_4$, 3.5% ZnO and 29.5% sodium silicate.

* * * * *

PO-1050
(5/69)

UNITED STATES PATENT OFFICE
CERTIFICATE OF CORRECTION

Patent No. 3,622,436  Dated November 23, 1971

Inventor(s) John N. Johnson

It is certified that error appears in the above-identified patent and that said Letters Patent are hereby corrected as shown below:

Column 3, line 17, between "be" and "preferred" insert -- a -- ; column 4, line 55, change "$NiFe_2N_4$" to -- $NiFe_2O_4$ -- ; column 5, line 13, change "may" to -- my -- ; line 26, change "about" to -- above -- .

Signed and sealed this 27th day of June 1972.

(SEAL)
Attest:

EDWARD M. FLETCHER, JR.
Attesting Officer

ROBERT GOTTSCHALK
Commissioner of Patents